United States Patent
Wachi et al.

(10) Patent No.: US 6,763,657 B2
(45) Date of Patent: Jul. 20, 2004

(54) EXHAUST GAS PURIFYING METHOD OF INTERNAL COMBUSTION ENGINE

(75) Inventors: Satoshi Wachi, Tokyo (JP); Hiromichi Hisato, Kobe (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/244,422

(22) Filed: Sep. 17, 2002

(65) Prior Publication Data

US 2003/0051464 A1 Mar. 20, 2003

(30) Foreign Application Priority Data

Sep. 19, 2001  (JP) ........................................ 2001-284660

(51) Int. Cl.⁷ .............................................. F01N 3/00
(52) U.S. Cl. .............................. 60/285; 60/274; 60/276
(58) Field of Search ......................... 60/274, 276, 285, 60/286, 301

(56) References Cited

U.S. PATENT DOCUMENTS

| | | | | |
|---|---|---|---|---|
| 5,450,722 A | * | 9/1995 | Takeshima et al. | ........... 60/285 |
| 5,501,074 A | * | 3/1996 | Suetsugu et al. | ............. 60/285 |
| 6,161,377 A | | 12/2000 | Boegner et al. | |
| 6,378,297 B1 | * | 4/2002 | Ito et al. | ....................... 60/285 |
| 6,553,757 B1 | * | 4/2003 | Surnilla et al. | ................ 60/274 |
| 6,574,953 B1 | * | 6/2003 | Ingram et al. | ................. 60/286 |

FOREIGN PATENT DOCUMENTS

| | | |
|---|---|---|
| DE | 19747222 C1 | 3/1999 |
| DE | 19912833 A1 | 9/1999 |
| JP | 2600492 | 1/1997 |
| JP | 11-107811 | 4/1999 |
| JP | 11-270382 A | 5/1999 |
| WO | WO 93-07363 | 4/1993 |

* cited by examiner

*Primary Examiner*—Thomas Denion
*Assistant Examiner*—Tu M. Nguyen
(74) *Attorney, Agent, or Firm*—Sughrue Mion, PLLC

(57) ABSTRACT

An air-fuel ratio of exhaust gas flowing into a NOx absorber catalyst is compulsorily changed from a lean side to a rich side to release NOx absorbed by the NOx absorber catalyst. The Nox is reduced at the same time. If temperature of the NOx absorber catalyst is lower than a first predetermined temperature T1, temporaral change of the air-fuel ratio of the exhaust gas to the rich side for the purpose of releasing and reducing NOx is inhibited, and if temperature of the NOx absorber catalyst is higher than the first predetermined temperature T1 and lower than a second predetermined temperature T2, at the time of changing temporarily the air-fuel ratio of the exhaust gas to the rich side for the purpose of releasing and reducing NOx, timing of changing the air-fuel ratio and the set air-fuel ratio are changed depending on the temperature of the NOx absorber catalyst.

16 Claims, 6 Drawing Sheets

EXHAUST GAS PURIFYING METHOD OF INTERNAL COMBUSTION ENGINE

BACKGROUND OF THE INVENTION

1. Field of the Invention

The present invention relates to an exhaust gas purifying method of an internal combustion engine using a NOx absorber catalyst.

2. Background Art

Hitherto in exhaust gas purifying system using a NOx absorber catalyst, NOx exhausted in a lean operation state of an internal combustion engine is absorbed by the NOx absorber catalyst, the operation state of the internal combustion engine is changed to a rich operation state so that NOx absorbed by the NOx absorber catalyst is released and reduced at the same time at every predetermined period (as is disclosed in, for example, the Japanese Patent No. 2600492).

It is generally known that a catalyst does not sufficiently function below a predetermined temperature (activation temperature). The NOx absorber catalyst does not sufficiently function below the activation temperature, either. Therefore, air-fuel ratio control of the conventional exhaust gas purifying method using the NOx absorber catalyst also includes any process such as inhibiting lean operation in the case where it is judged that the NOx absorber catalyst is below a predetermined temperature.

However, when studying in detail, it is found that the temperature characteristics of absorbing and releasing NOx of the NOx absorber catalyst is shown as FIG. 4. In FIG. 4(a), C-Nox is an absorbing capacity of the NOx absorber catalyst. In FIG. 4(b), Vo is a velocity of absorbing NOx of the NOx absorber catalyst. In FIG. 4(c), Ve is a velocity of releasing NOx of the NOx absorber catalyst. And in FIG. 4, T is a temperature of the NOx absorber catalyst.

In FIG. 4, it is found that as long as the NOx absorber catalyst is in a temperture range from T0 to T1, it is possible to absorb NOx but NOx is not released (releasing speed is 0), and in a temperature range from T1 to T2, NOx is sufficiently absorbed but is not sufficiently released (releasing speed is low). This means that sufficient effect is not obtained without giving due consideration to the temperature at the time of making the air-fuel ratio rich to reduce NOx.

Several inventions have been proposed giving consideration to temperature of the NOx absorber catalyst. For example, temperature of the catalyst has been considered in estimating the amount of NOx actually absorbed and estimating the amount of NOx that can be absorbed. Temperature of the NOx absorber catalyst is also considered when NOx is released in order to reactivate the ability for absorbing NOx once deteriorated due to sulfur oxide (Sox). However, none of the conventional inventions has given consideration to the temperature of the NOx absorber catalyst at the time when the air-fuel ratio is changed to the rich side in order to release and reduce the absorbed Nox. In particular, no consideration has been given to the fact that it is impossible to sufficiently release the absorbed NOx when the NOx absorber catalyst is at a low temperature.

Therefore, A problem exists in the conventional systems that the air-fuel ratio is changed to the rich side despite that the temperature of the NOx absorber catalyst is in a range where the NOx absorber catalyst cannot sufficiently release NOx, which eventually results in increase in toxic components (HC and CO) of the exhaust gas, otherwise inhibiting lean operation in this temperature range thereby reducing the advantage of less fuel consumption.

SUMMARY OF THE INVENTION

The present invention was made to solve the above-discussed problems, and intends to prevent exhaust gas from increase in toxic components and secure a lean operation time and favorable fuel consumption by inhibiting changing air-fuel ratio to the rich side otherwise by temporarily changing the air-fuel ratio nearly to a stoichiometric air-fuel ratio to raise temperature of the NOx absorber catalyst and then gradually making the air-fuel ratio rich, in the case where the temperature of a NOx absober catalyst is lower than a predetermined temperature.

A method of purifying exhaust gas of an internal combustion engine according to the invention utilizes a NOx absorber catalyst. This NOx gas occlusion catalyst absorbs NOx when oxygen concentration of exhaust gas flowing in is excessively increased, while releases NOx and reduces the NOx at the same time when the oxygen concentration of the exhaust gas is lowered. For the purpose of releasing NOx absorbed by the mentioned NOx absorber catalyst and reducing the NOx at the same time, an air-fuel ratio of the exhaust gas flowing into the mentioned NOx absorber catalyst is compulsorily changed from the lean side to the rich side.

More specifically, first, a temperature range where the mentioned NOx absorber catalyst can absorb NOx but does not release NOx is assumed as a range from a predetermined temperature T0 to a first predetermined temperature T1. Then a temperature range where the mentioned NOx absorber catalyst can sufficiently absorb NOx but does not sufficiently release NOx is assumed as a range from the first predetermined temperature T1 to a second predetermined temperature T2.

If the temperature of the mentioned NOx absorber catalyst is lower than the second predetermined temperature T2, the air-fuel ratio at the time of temporarily changing the air-fuel ratio of the exhaust gas to the rich side to release and reduce NOx is set depending on the temperature of the NOx absorber catalyst.

As a result, in the mentioned method of purifying exhaust gas of an internal combustion engine according the invention, if it is judged that the temperature of the NOx absorber catalyst is lower than the second predetermined value T2, the air-fuel ratio at the time of changing the air-fuel ratio to the rich side to release and reduce the absorbed NOx is set depending on the temperature of the NOx absorber catalyst. It is therefore possible to maintain desirable fuel consumption without increasng the toxic components of the exhaust gas and simplify the air-fuel ratio control.

Another method of purifying exhaust gas of an internal combustion engine according the invention utilizes means for controlling an air-fuel ratio of the internal combustion engine by changing the air-fuel ratio to a lean air-fuel ratio, a stoichiometric air-fuel ratio or a rich air-fuel ratio according to operating conditions of the internal combustion engine and a NOx absorber catalyst for absorbing NOx when an oxygen concentration of exhaust gas flowing in is excessively increased and releasing NOx and reducing the NOx at the same time when the oxygen concentration of the exhaust gas is lowered. At the time of changing the air-fuel ratio from the lean air-fuel ratio to the stoichiometric air-fuel ratio according to the operating conditions of the internal combustion engine, the air-fuel ratio is changed to the stoichiometric air-fuel ratio after the air-fuel ratio has been compulsorily changed to the rich air-fuel ratio. Thus NOx absorbed by the NOx absorber catalyst during the lean operation is released and is reduced at the same time.

In the mentioned air-fuel ratio at the time of temporarily changing the air-fuel ratio of the exhaust gas to the rich side, the air-fuel ratio is set depending on temperature of the mentioned NOx absorber catalyst.

As a result, in the mentioned method of purifying exhaust gas of an internal combustion engine of the invention, at the time of changing from operation with lean air-fuel ratio to operation with stoichiometric air-fuel ratio due to any variation in operating conditions of the vehicle, the air-fuel ratio is temporarily changed compulsorily to the rich air-fuel ratio to release and reduce NOx absorbed during the lean air-fuel ratio operation. In such changing operation, the rich air-fuel ratio is set depending on catalyst temperature, and as a result it is possible to favorably reduce the exhaust gas and simplify the arrangement of air-fuel ratio control.

DESCRIPTION OF THE PREFERRED EMBODIMENTS

Embodiment 1.

Figure 1:
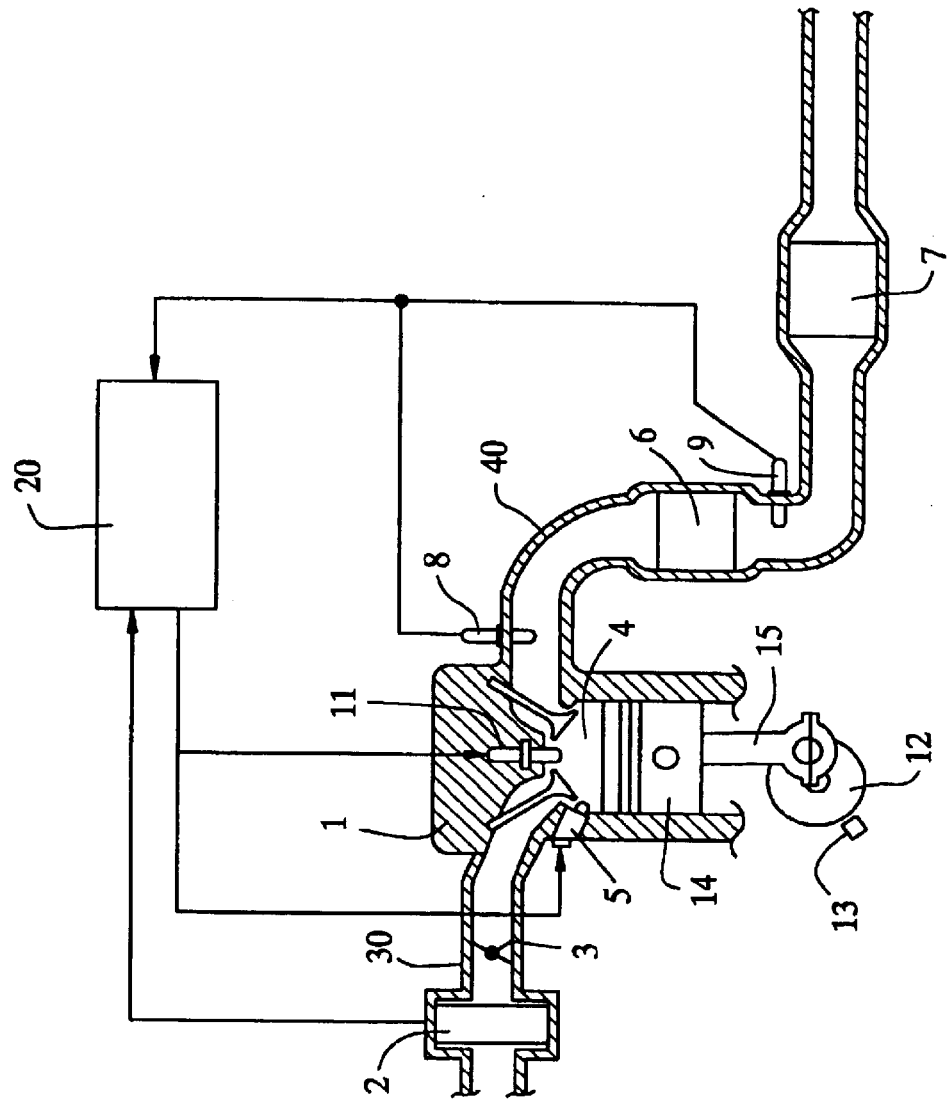
FIG. 1 is a schematic view of an exhaust gas purifying system of an internal combustion engine according to Embodiment 1 of the invention.

An exhaust gas purifying method of an internal combustion engine according to Embodiment 1 of the invention is hereinafter described with reference to the accompanying drawings. FIG. 1 is a schematic view of an exhaust gas purifying system of an internal combustion engine according to Embodiment 1 of the invention.

An internal combustion engine 1 shown in FIG. 1 is one of cylinders of a fuel controller of a multi-cylinder internal combustion engine. An intake pipe 30 communicating with this internal combustion engine 1 is provided with a sucked air amount sensor 2 for measuring an amount of air sucked into the internal combustion engine 1 and a throttle valve 3 for controlling the amount of air sucked into the internal combustion engine 1.

The sucked air, whose flow rate is measured by the sucked air amount sensor 2, is introduced to a combustion chamber 4 of the internal combustion engine 1, and the air is mixed with a fuel supplied from a fuel injector 5 thus an air-fuel mixture being composed. Then, an ignition plug 11 ignites and burns the air-fuel mixture.

A cylinder having the combustion chamber 4 is provided with a piston 14 moving up and down, and a crankshaft 12 is driven and rotated through a piston rod 15. A crank angle sensor 13 is disposed in the vicinity of the crankshaft 12 and detects an engine speed of the internal combustion engine.

On the other hand, the combustion chamber 4 of the internal combustion engine 1 communicates to an exhaust pipe 40, and a three way catalyst 6 for purifying exhaust gas and a NOx absorber catalyst 7 are disposed in the exhaust pipe 40. Further, an air-fuel ratio sensor 8 for detecting an air-fuel ratio in the exhaust gas is disposed upstream the three way catalyst 6, and an exhaust gas temperature sensor 9 is disposed downstream the three way catalyst 6.

An engine controller 20 is composed of a microcomputer unit, and reads in signals from the sensors such as the sucked air amount sensor 2, the air-fuel ratio sensor 8, the exhaust gas temperature sensor 9 and the crank angle sensor 13. Then the engine controller 20 drives the fuel injector 5, the ignition plug 11, etc. on the basis of these signals.

In the mentioned NOx absorber catalyst 7, for example, alumina is used as a carrier. Any noble metal such as platinum and at least one of alkali metals such as potassium K, sodium Na, lithium Li, or cesium Cs, alkaline earth such as barium Ba or calcium Ca, and rare earth such as lanthanum La or yttrium Y are carried on this carrier. This NOx absorber catalyst 7 absorbs NOx when an oxygen concentration of exhaust gas flowing in is excessively high, and releases NOx and reduces the NOx at the same time when the oxygen concentration of the exhaust gas is lowered.

Figure 2:
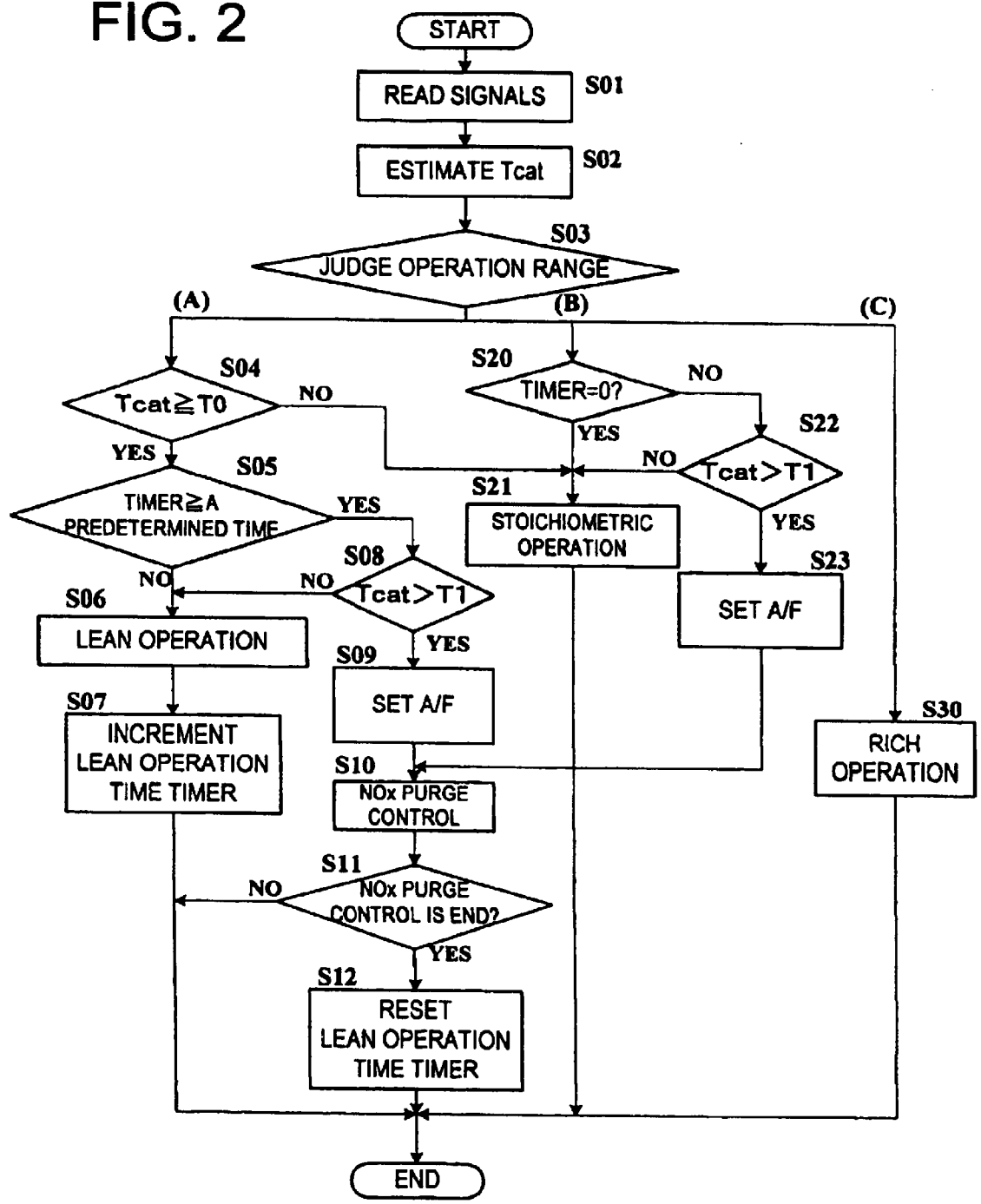
FIG. 2 is a flowchart of a method of purifying exhaust gas of an internal combustion engine according to Embodiment 1 of the invention.

Now exhaust gas purifying method of an internal combustion engine according to this Embodiment 1 is hereinafter described with reference to FIG. 2. FIG. 2 is a flowchart showing operation of the exhaust gas purifying method of an internal combustion engine according to Embodiment 1 of the invention.

The flowchart in FIG. 2 shows a process of determining the air-fuel ratio with which the internal combustion engine is operated according to the operating conditions (engine speed, engine load, water temperature, accelerator opening, and so on) of the internal combustion engine, and this process is repeatedly carried out at predetermined periods, for example, every predetermined time (10 msec) or every predetermined crank angle (every 180° in crank angle).

First, in step S01, signals from the various sensors are read in. Next, in step S02, the temperature (Tcat) of the NOx absorber catalyst 7 is estimated on the basis of the signal of the exhaust gas temperature sensor 9 read in step S01. Subsequently, in step S03 of judging operation range, whether the internal combustion engine is currently operated in an operation range (A) where the air-fuel ratio is lean, an operation range (B) where the air-fuel ratio is stoichiometric or an operation range (C) where the air-fuel ratio is rich, is judged on the basis of inputs from the sensors read in step S01.

If it is judged that the engine is operated in the operation range (A) where the air-fuel ratio is lean in the foregoing step S03, the process on and after step S04 is carried out. If it is judged that the engine is operated in the operation range (B) where the air-fuel ratio is stoichiometric, the process on and after step S20 is carried out. If it is judged that the engine is operated in the operation range (C) where the air-fuel ratio is rich, the process advances to step S30, the engine is operated at a rich air-fuel ratio according to the operating conditions of the engine, and the process comes to end.

The process in each operation range is now described below.

To begin with, a case where it is judged in step S03 that the engine is operated in the operation range (A) where the air-fuel ratio is lean is described. First, in step S04, whether or not the NOx absorber catalyst temperature (Tcat) is higher than the predetermined temperature T0 is judged. If it is judged that the NOx absorber catalyst temperature is lower than the predetermined temperature T0 (in case of NO), this means that the NOx absorber catalyst temperature is below (i.e., does not reach) the activation temperature of the NOx absorber catalyst 7 and is in a temperature range where neither occlusion nor emission of NOx is possible, and in this case, lean operation is inhibited and stoichiometric operation is carried out (the process advances to step S21). On the other hand, if it is judged in step S04 that the NOx absorber catalyst temperature (Tcat) is higher than the predetermined temperature T0 (in case of YES), this means that the NOx absorber catalyst temperature is in a temperature range where the NOx absorber catalyst 7 can absorb NOx, and in this case, lean operation is permitted and the process on and after step S05 is carried out.

In step S05, timing of carrying out NOx purge control is judged. More specifically, whether or not the accumulated lean operation time passed up to now is over a predetermined time is judged, and if it is judged that the lean operation has continued exceeding the predetermined time (in case of YES), it is judged that timing of carrying out NOx purge control has come, and the process on and after step S08 is carried out. On the other hand, if the predetermined time has not passed yet (in case of NO), it is judged that timing of carrying out NOx purge control has not come yet, the process advances to step S06 and the engine is operated at the lean air-fuel ratio, a lean operation time timer is incremented in step S07, and the process comes to end.

In step S08, whether or not the NOx absorber catalyst temperature (Tcat) is higher than the predetermined temperature T1 is judged, thereby whether or not NOx purge control is possible being determined. If the NOx absorber catalyst temperature (Tcat) is higher than the predetermined temperature T1, it is possible to release NOx and it is judged that NOx purge control can be carried out (YES), and the process advances to step S09 where NOx purge control is carried out. If the catalyst temperature is not higher than the predetermined temperature T1, it is not possible to release NOx from the NOx absorber catalyst 7, and therefore it is judged that it is impossible to carry out NOx purge control (NO), the process advances to step S06, and the lean operation is continued without changing the air-fuel ratio.

Steps S09 to S12 show the process of NOx purge control.

Figure 3:
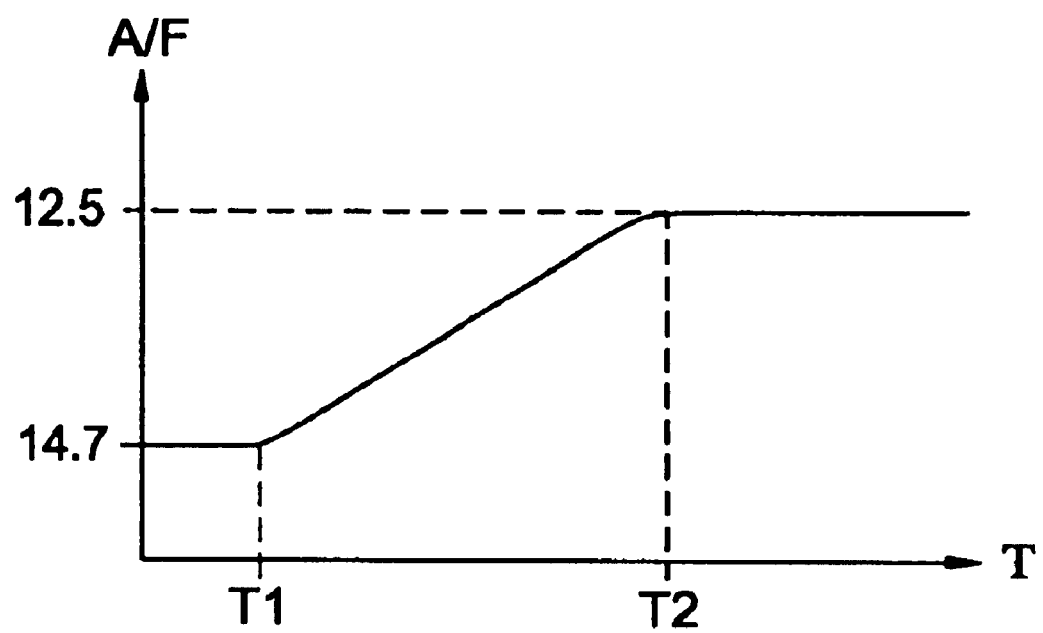
FIG. 3 is a map for setting an air-fuel ratio at the time of purifying NOx according to the embodiments of the invention.
Figure 4:
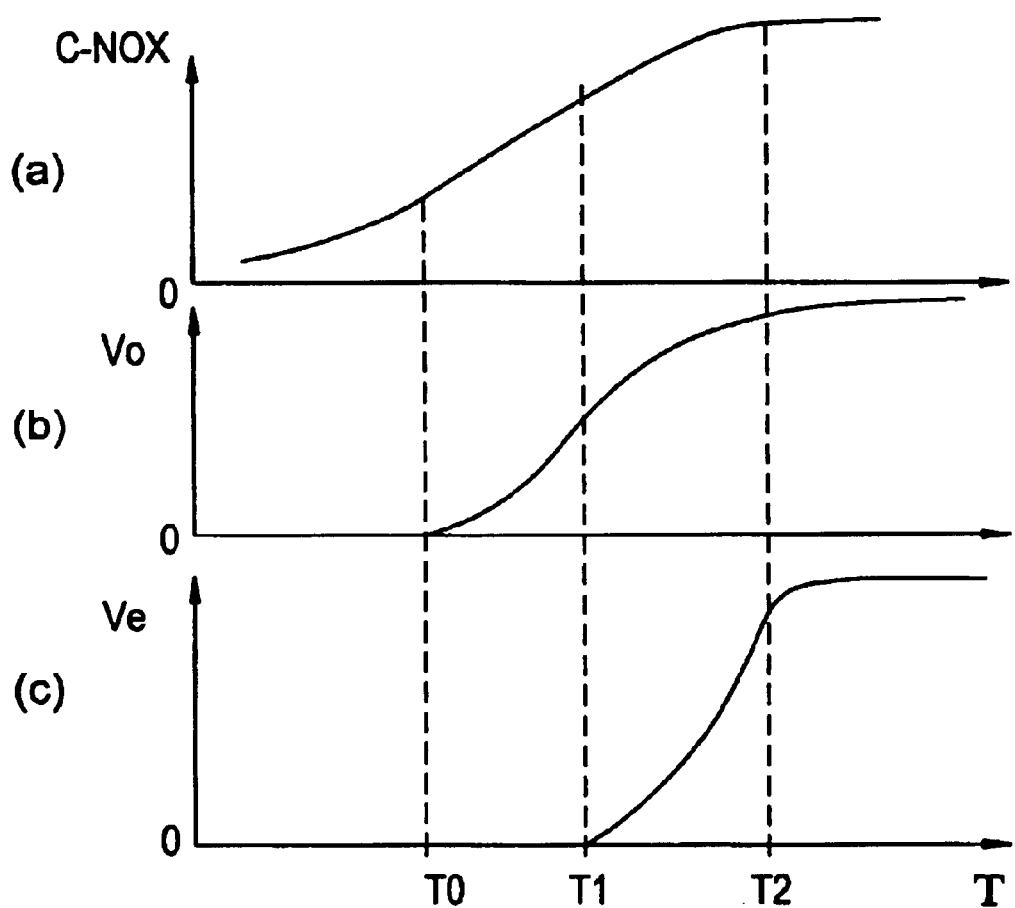
FIG. 4 is graphic diagram showing temperature characteristics of a NOx absorber catalyst used in the embodiments of the invention.

First, in step S09, the air-fuel ratio (A/F) at the time of carrying out Nox purge control is set depending on the temperature of the NOx absorber catalyst 7. In practice, the set air-fuel ratio (A/F) at the time of Nox purge control is read in using the current temperature T of the NOx absorber catalyst as a parameter on the basis of a map as shown in FIG. 3. In this map, the set air-fuel ratio (A/F) is indicated richer as the catalyst temperature is higher as long as the NOx absorber catalyst temperature is in the temperature range from T1 to T2. In the temperature range of the catalyst from T1 to T2, emission of NOx is possible but not sufficient, and therefore the set air-fuel ratio gradually grows richer in conformity with NOx emission characteristics of the NOx absorber catalyst 7.

Next, in step S10, the engine is operated at the air-fuel ratio (A/F) set in step S09, and NOx absorbed in the NOx absorber catalyst 7 is released, and the NOx is reduced at the same time. After that, the process advances to step S11, and end of NOx purge control is judged.

In step S11, whether or not NOx absorbed in the NOx absorber catalyst was sufficiently released is judged, and whether the NOx purge control should be ended or continued is determined. More specifically, an estimated NOx occlusion amount estimated as an amount of NOx absorbed during the lean operation is compared with an amount of a reductant (reducing agent such as hydro carbon or carbon monoxide) supplied during the NOx purge control. If the estimated NOx occlusion amount is stoichiometrically equal to the reductant amount, it is judged that NOx has been sufficiently released and reduced. When it is determined that the NOx purge control should be ended (YES) in this step, the process advances to step S12, and the lean operation time timer is reset, thus the process comes to end. If it is judged that the NOx purge control should not be ended (NO), step S12 is skipped over and the process comes to end.

Now, described below is the case where it is judged in step S03 that the engine is operated in the operation range (B) where the air-fuel ratio is stoichiometric.

In step S20, whether or not the lean operation time timer reads 0 is judged. If the air-fuel ratio (A/F) is changed to the stoichiometric air-fuel ratio with NOx absorbed in the NOx absorber catalyst 7, it happens that the absorbed NOx is released to the air without being reduced. To prevent such a situation, it is necessary to judge whether or not NOx is absorbed in the NOx absorber catalyst. If NOx is judged absorbed, it is necessary to compulsorily change the air-fuel ratio (A/F) to the rich side and carry out NOx purge control. If the lean operation timer does not indicate 0, any lean operation was carried out before getting into the stoichiometric operation range, and NOx absorbed during the lean operation remains in the NOx absorber catalyst without being sufficiently released from the NOx absorber catalyst. Therefore it is necessary to reduce NOx.

In other words, if it is judged that the lean operation time timer indicates 0 in step S20 (YES), this means that any lean operation was not carried out before getting into the stoichiometric operation range and NOx is not absorbed in the NOx absorber catalyst. Accordingly the process advances to step S21 and the engine is operated at the stoichiometric air-fuel ratio, and the process comes to end. On the other hand, if it is judged that the lean operation time timer does not indicate 0 (NO), this means that any lean operation was carried out before getting into the stoichiometric operation range and NOx absorbed during the lean operation remains in the NOx absorber catalyst without being sufficiently released from the NOx absorber catalyst. Accordingly, the process advances to step S22 and NOx purge control is carried out.

In step S22, in the same way as in step S08, whether or not the NOx absorber catalyst temperature is higher than the predetermined temperature T1 is judged, and whether or not NOx purge control is possible is determined. If the NOx absorber catalyst temperature is higher than T1 (YES), the process advances to step S23, and NOx purge control is carried out. If the NOx absorber catalyst temperature is not higher than T1 (NO), the process advances to step S21 and the engine is operated at the stoichiometric air-fuel ratio, and the process comes to end.

As described above, if the air-fuel ratio (A/F) is changed to the stoichiometric air-fuel ratio with NOx absorbed in the NOx absorber catalyst 7, the absorbed NOx is released to the air without being reduced. However, when the process advances from step S22 to step S21, temperature of the NOx absorber catalyst is not higher than the predetermined temperature T1, and therefore NOx is not released under this condition. Accordingly, there is no possibility that the absorbed NOx is released to the air without being reduced. If the operation continues at the stoichiometric air-fuel ratio, the NOx absorber catalyst temperature rises and comes to reach the predetermined temperature T1. In such a case, it is judged YES in step S22 and NOx purge control is carried out, and NOx absorbed in this stage is released and reduced at the same time, and therefore the exhaust gas does not increase toxic components.

In step S23, in the same manner as in step S09, the set air-fuel ratio (A/F) at the time of NOx purge control is read in. In the same manner as shown in FIG. 3, the set air-fuel ratio (A/F) also grows richer as the catalyst temperature is higher as long as the catalyst temperature is in the range from T1 to T2. Then, the process advances to step S10, and the engine is operated with the air-fuel ratio (A/F) set in step S22. Then the process goes on to judgment of the end of NOx purge control, and the process comes to end.

As described above, in this Embodiment 1, it is possible to inhibit NOx purge control when the NOx absorber catalyst temperature is lower than the predetermined temperature T1. It is also possible to achieve that NOx purge control gradually grows richer conforming to the NOx emission characteristics of the NOx absorber catalyst when the NOx absorber catalyst temperature is higher than the predetermined temperature T1 and lower than the predetermined temperature T2. As a result, it is possible to secure the lean operation range and maintain favorable fuel consumption without increase of toxic components in the exhaust gas.
Embodiment 2.

An exhaust gas purifying method of an internal combustion engine according to Embodiment 2 of the invention is hereinafter described with reference to the drawings. The system in this embodiment has the same constitution as in the foregoing Embodiment 1 (FIG. 1), and further explanation thereof is omitted herein.

Figure 5:
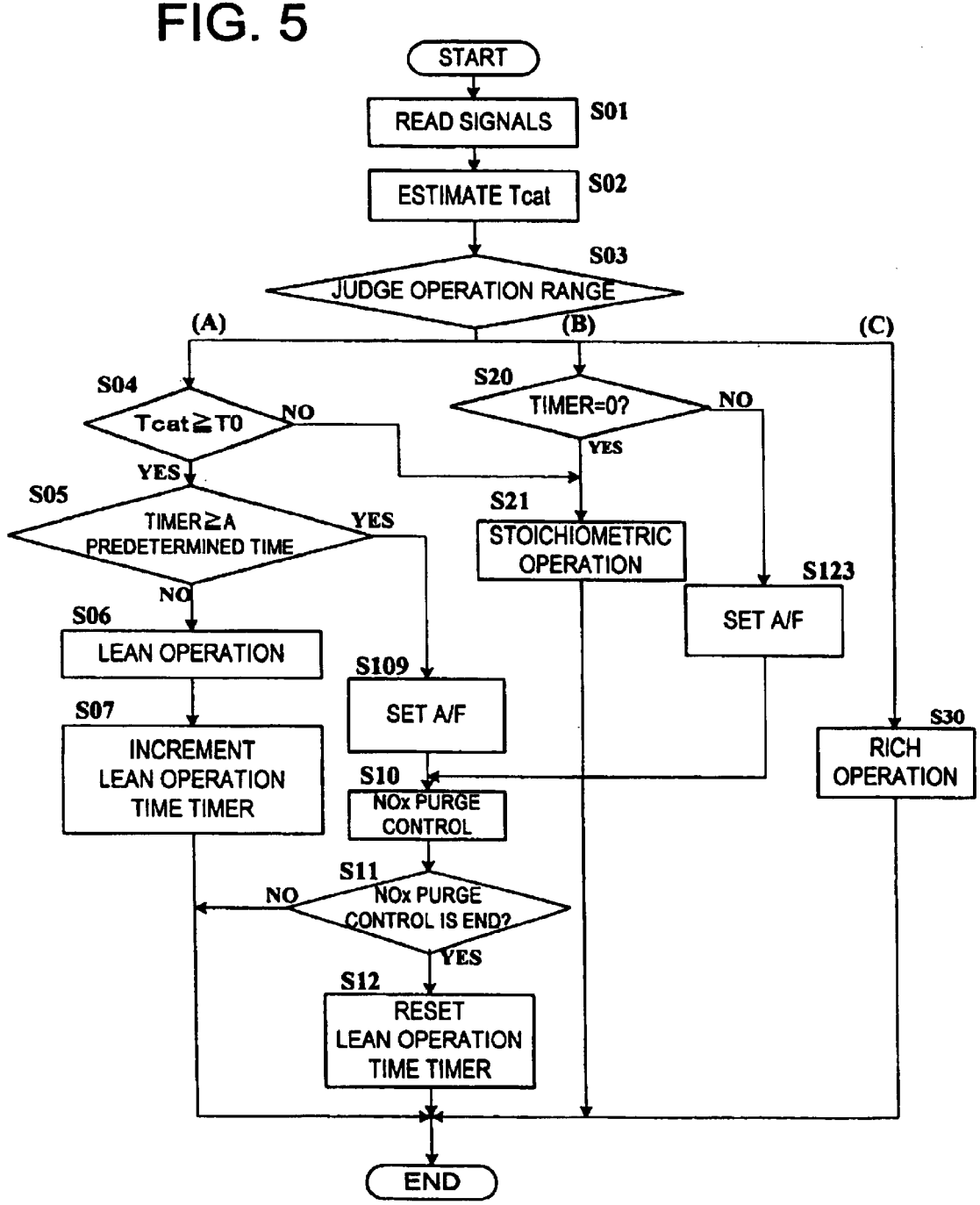
FIG. 5 is a flowchart of a method of purifying exhaust gas of an internal combustion engine according to Embodiment 2 of the invention.

FIG. 5 is a flowchart showing operation of the exhaust gas purifying method of an internal combustion engine according to Embodiment 2 of the invention, and operation of this embodiment is hereinafter described in detail referring to this drawing.

The flowchart in FIG. 5 is a modification of the flowchart of FIG. 2, and the same reference numerals are designated to steps common in both flowcharts. FIG. 5 differs from FIG. 2 only in the aspect that step S08 and step S22 of judging the NOx absorber catalyst temperature in FIG. 2 are both omitted and step S09 and step S23 of setting the air-fuel ratio (A/F) at the time of NOx purge control are changed to steps S109 and S123. Those differences are now described, and description of the portions remaining unchanged is omitted.

The first difference comes in the process of judging whether or not the lean operation time has reached over a predetermined time in step S05 and determining that the lean operation has continued for more than the predetermined time (YES). In FIG. 2, the NOx absorber catalyst temperature is judged in step S08. On the other hand, in the flowchart of FIG. 5, without judging the NOx absorber catalyst temperature, the process advances to step S109 and NOx purge control is carried out.

In step S109, the set air-fuel ratio (A/F) at the time of NOx purge control is read on the basis of the map shown in FIG. 3 using the current temperature T of the NOx absorber catalyst as a parameter. In this map, the set air-fuel ratio (A/F) is a stoichiometric air-fuel ratio in the temperature range where the catalyst temperature is lower than the predetermined temperature T1.

Since the air-fuel ratio is set as shown in the map of FIG. 3, when the NOx absorber catalyst temperature is higher than the predetermined temperature T1, the operation is the same as in the foregoing Embodiment 1 shown in FIG. 2. When the NOx absorber catalyst temperature is lower than the predetermined temperature T1, the set air-fuel ratio (A/F) at the time of NOx purge control is changed to the stoichiometric air-fuel ratio. In this case, as described in step S22 of Embodiment 1 referring to FIG. 2, without being reduced, NOx absorbed in the NOx absorber catalyst is not released to the air, and the temperature of the NOx absorber catalyst is effectively raised by continuing operation at the stoichiometric air-fuel ratio. When the temperature of the NOx absorber catalyst rises and comes to exceed the predetermined temperature T1, the absorbed NOx is gradually released. Furthermore, according to the setting of the map in FIG. 3, the set air-fuel ratio (A/F) gradually grows richer in the temperature range where the NOx absorber catalyst temperature is higher than the predetermined temperature T1. Consequently, the reductant (such as hydro carbon or carbon monoxide) is supplied depending on the released amount of NOx to reduce the exhaust gas.

The second difference comes in the process of judging that the operation changed from the lean operation range to the stoichiometric operation range and NOx is absorbed in the NOx absorber catalyst in step S20. In this case, in the same manner as in the first difference, without judging the NOx absorber catalyst temperature, the process advances to step S123, and NOx purge control is carried out.

In step S123, in the same manner as in step S109, the set air-fuel ratio (A/F) at the time of NOx purge control is read in on the basis of the map using the current temperature of the NOx absorber catalyst as a parameter. In this map, in the same manner as in the map of FIG. 3, the set air-fuel ratio (A/F) is changed to the stoichiometric air-fuel ratio in the temperature range where the catalyst temperature is lower than the predetermined temperature T1. As a result, it is possible to carry out the same operation as described in step S22 referring to FIG. 2 and obtain the same effect.

As described above, in this Embodiment 2, the process is entirely simplified as compared with that in the foregoing Embodiment 1. Furthermore, when the NOx absorber catalyst temperature is low in the lean operation range, the temperature of the NOx absorber catalyst is positively raised to keep the exhaust gas desirable.
Embodiment 3.

An exhaust gas purifying method of an internal combustion engine according to Embodiment 3 of the invention is hereinafter described. In this Embodiment 3, when the NOx absorber catalyst temperature is lower than the predetermined temperature T2, the predetermined time for judging the lean operation time in step S05 in the flowcharts of Embodiment 1 (FIG. 2) and Embodiment 2 (FIG. 5) is set to be longer than in other cases.

Figure 6:
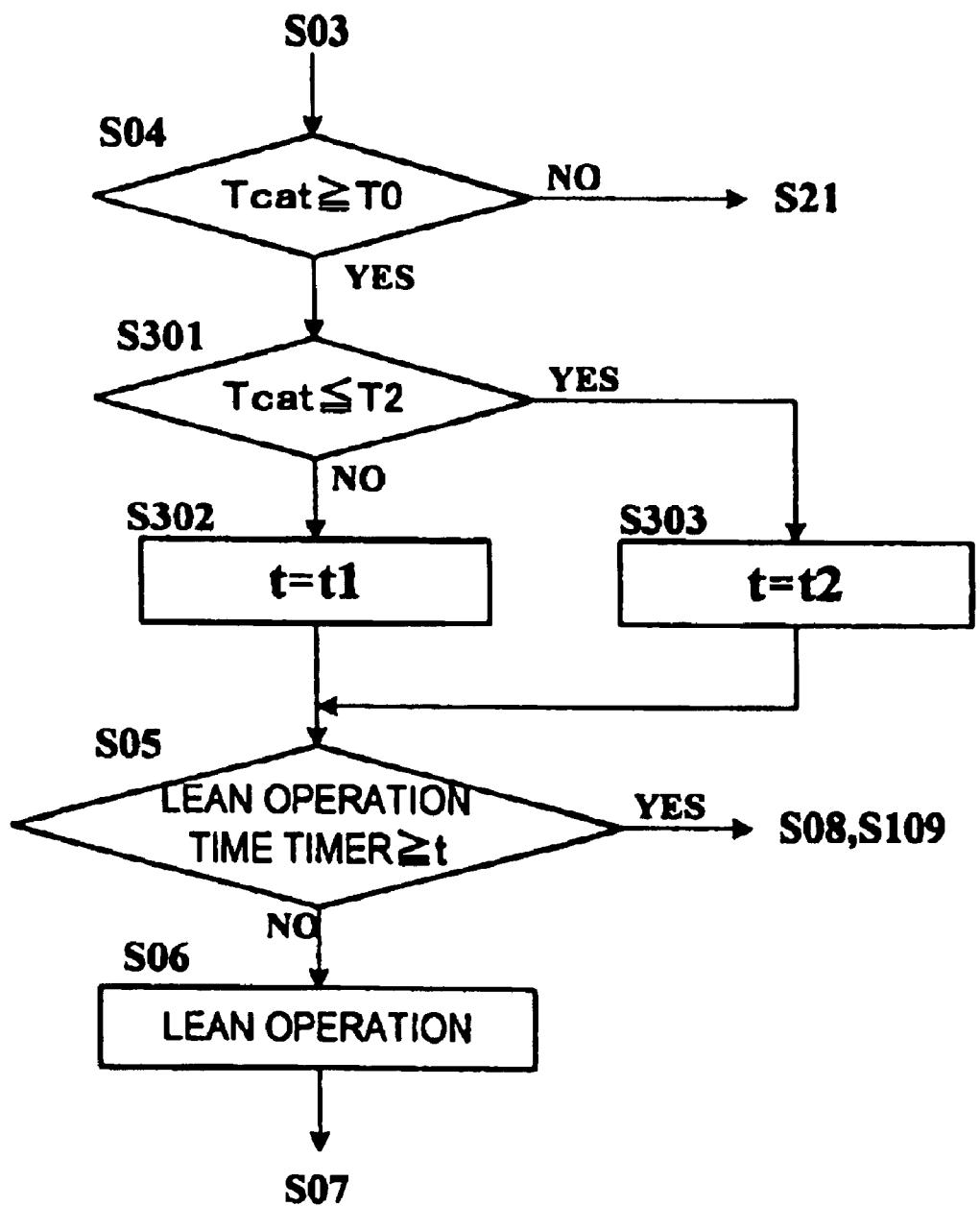
FIG. 6 is a flowchart of a method of purifying exhaust gas of an internal combustion engine according to Embodiment 3 of the invention.

FIG. 6 is a flowchart showing operation of the exhaust gas purifying method of an internal combustion engine according to Embodiment 3 of the invention, and shows a part of the flowcharts of FIG. 2 (Embodiment 1) and FIG. 5 (Embodiment 2).

In FIG. 6, whether or not the NOx absorber catalyst temperature (Tcat) is higher than the predetermined temperature T0 is judged in step S04. If it is judged that the NOx absorber catalyst temperature (Tcat) is higher than the predetermined temperature T0 (in case of YES) in this step, this means that the catalyst is in a temperature range where the NOx absorber catalyst 7 can absorb NOx. Therefore lean operation is permitted and the process advances to step S301. In step S301, whether or not the NOx absorber catalyst temperature (Tcat) is lower than the predetermined temperature T2 is judged. In this step, if the NOx absorber catalyst temperature (Tcat) is higher than the predetermined temperature T2, t1 is employed as the predetermined time t for judging the lean operation time in S302. On the other hand, if the NOx absorber catalyst temperature (Tcat) is lower than the predetermined temperature T2, t2, which is longer than the mentioned t1, is employed as the predetermined time t for judging the lean operation time in S303. Subsequently, in step S05, whether or not the accumulated lean operation time passed up to now is over a predetermined time t is judged.

By carrying out the foregoing process, it is possible to secure a longer lean operation time and hold the toxic components of the exhaust gas to the minimum. In general, the engine is operated at a low speed and the load is light when the temperature range of the NOx absorber catalyst 7 is low. Under such conditions, the engine exhausts less NOx, and amount of NOx leaking downstream without being absorbed by the NOx absorber catalyst is very small even if the lean operation time is longer than an ordinary lean operation time. Consequently toxic components of the exhaust gas are held to the minimum and the lean operation time is secured long, and this will improve fuel consumption.

Other Embodiments

In each of the foregoing embodiments, the temperature of the NOx absorber catalyst 7 is estimated on an output value of the exhaust gas temperature sensor 9. It is also preferable to estimate the temperature of the NOx absorber catalyst 7, for example, on the basis of the exhaust gas temperature (estimated by, for example, making a map of the engine speed and the engine load and correcting a value read out from the map with the air-fuel ratio) estimated on the operating conditions of the engine (engine speed, engine load, A/F, water temperature, etc.). Furthermore, it is also possible to dispose a catalyst temperature detector for directly measuring the temperature of the NOx absorber catalyst 7.

Additional Description of the Invention

Additional features and advantages of the method of purifying exhaust gas of an internal combustion engine according to the invention are hereinafter described.

A first additional feature of the method of purifying exhaust gas of an internal combustion engine of the invention is a definition given to claim 1 depending thereon. That is, if temperature of the NOx absorber catalyst is lower than the first predetermined temperature T1, it is set that temporal change of air-fuel ratio of the exhaust gas to the rich side for the purpose of releasing and reducing NOx is inhibited. If temperature of the NOx absorber catalyst is higher than the first predetermined temperature T1 and lower than the second predetermined temperature T2, at the time of temporarily changing the air-fuel ratio of the exhaust gas to the rich side for the purpose of releasing and reducing NOx, the air-fuel ratio is set to be less rich at first and then grow gradually richer.

As a result, in the method of purifying exhaust gas of an internal combustion engine of the invention having the mentioned first additional feature, it is possible to restrain toxic components of the exhaust gas (especially hydro carbon and carbon monoxide) from increase. At the same time, it is possible to secure the lean operation time and achieve less fuel consumption.

A second additional feature of the method of purifying exhaust gas of an internal combustion engine of the invention is a definition given to the mentioned first additional feature. That is, in the foregoing first additional feature, when air-fuel ratio of the exhaust gas is changed to the rich side, the air-fuel ratio gradually is set to grow richer depending on the temperature of the NOx absorber catalyst.

As a result, in the second additional feature of the method of purifying exhaust gas of an internal combustion engine of the invention, it is possible to favorably restrain toxic components of the exhaust gas from increase and achieve favorable fuel consumption.

A third additional feature of the method of purifying exhaust gas of an internal combustion engine of the invention is a definition given to claim 1. That is, if temperature of the NOx absorber catalyst is lower than the first predetermined temperature T1, at the time of temporarily changing the air-fuel ratio of the exhaust gas to the rich side for the purpose of releasing and reducing NOx, the air-fuel ratio of the exhaust gas is temporarily changed to be nearly the stoichiometric air-fuel ratio and the temperature of the mentioned NOx absorber catalyst is raised, and when the temperature of the NOx absorber catalyst has come to not lower than the first predetermined temperature T1, the air-fuel ratio of the exhaust gas is changed to the rich side, and NOx is released from the NOx absorber catalyst and is reduced at the same time.

As a result, in the third additional feature of the method of purifying exhaust gas of an internal combustion engine of the invention, it is possible to restrain toxic components of the exhaust gas from increase and maintain favorable fuel consumption.

A fourth additional feature of the method of purifying exhaust gas of an internal combustion engine of the invention is a definition given to the foregoing third additional feature. That is, at the time of changing the air-fuel ratio of the exhaust gas to the rich side, the air-fuel ratio is set to be less rich at first and then grow gradually richer.

As a result, in the fourth additional feature of the method of purifying exhaust gas of an internal combustion engine of the invention, it is possible to favorably restrain toxic components of the exhaust gas from increase and maintain favorable fuel consumption.

A fifth additional feature of the method of purifying exhaust gas of an internal combustion engine of the invention is a definition given to the foregoing fourth additional feature. That is, at the time of changing the air-fuel ratio of the exhaust gas to the rich side, the air-fuel ratio gradually grows richer depending on the temperature of the NOx absorber catalyst.

As a result, in the fifth additional feature of the method of purifying exhaust gas of an internal combustion engine of the invention, it is possible to more effectively restrain toxic components of the exhaust gas from increase and maintain favorable fuel consumption.

A sixth additional feature of the method of purifying exhaust gas of an internal combustion engine of the invention is a definition given to any of the foregoing first to fifth additional features. That is, if the temperature of the NOx absorber catalyst is lower than the second predetermined temperature T2, timing of temporarily changing the air-fuel ratio of the exhaust gas to the rich side for the purpose of releasing and reducing NOx is delayed.

As a result, in the sixth additional feature of the method of purifying exhaust gas of an internal combustion engine of the invention, it is possible to restrain toxic components of the exhaust gas from increase, secure the lean operation time to the maximum and achieve favorable fuel consumption.

A seventh additional feature of the method of purifying exhaust gas of an internal combustion engine of the invention is a definition given to claim 8. That is, on the assumption that a temperature range where the NOx absorber catalyst can absorb NOx but does not release NOx is a range from a predetermined temperature T0 to a first predetermined temperature T1, and a temperature range where the NOx absorber catalyst can sufficiently absorb NOx but does not sufficiently release NOx is a range from the first predetermined temperature T1 to a second predetermined temperature T2, when the temperature of the NOx absorber catalyst is lower than the first predetermined temperature T1, compulsory change of the air-fuel ratio of the exhaust gas to the rich air-fuel ratio is inhibited, and operation at the stoichiometric air-fuel ratio is immediately started.

In this seventh additional feature of the method of purifying exhaust gas of an internal combustion engine of the invention, at the time of changing from operation at lean air-fuel ratio to operation at stoichiometric air-fuel ratio due to any variation in operating conditions of the vehicle, the air-fuel ratio is temporarily changed compulsorily to the rich air-fuel ratio to release and reduce NOx absorbed during the lean air-fuel ratio operation. When it is judged that the temperature of the NOx absorber catalyst is lower than the first predetermined temperature T1, compulsory change of the air-fuel ratio to the rich air-fuel ratio described above is inhibited, and operation ar the stoichiometric air-fuel ratio is started immediately. As a result, it is possible to restrain toxic components of the exhaust gas from increase (such as HC, CO).

An eighth additional feature of the method of purifying exhaust gas of an internal combustion engine of the invention is a definition given to the foregoing seventh additional feature. That is, when the air-fuel ratio is changed from the lean air-fuel ratio to the stoichiometric air-fuel ratio according to the operating conditions of the internal combustion engine, compulsory change of the air-fuel ratio to the rich air-fuel ratio is inhibited, and operation at the stoichiometric air-fuel ratio is started immediately, and thereafter, the air-fuel ratio of the exhaust gas is compulsorily changed to the rich air-fuel ratio when the temperature of the NOx absorber catalyst rises exceeding the first predetermined temperature T1.

As a result, in the eighth additional feature of the method of purifying exhaust gas of an internal combustion engine of the invention, it is possible to restrain toxic components of the exhaust gas from increase.

A ninth additional feature of the method of purifying exhaust gas of an internal combustion engine of the invention is a definition given to the foregoing eighth additional feature. That is, when the air-fuel ratio of the exhaust gas is compulsorily changed to the rich air-fuel ratio, the air-fuel ratio is set to be less rich at first and then grow gradually richer.

As a result, in the ninth additional feature of the method of purifying exhaust gas of an internal combustion engine of the invention, it is possible to inhibit toxic components of the exhaust gas from increase.

A tenth additional feature of the method of purifying exhaust gas of an internal combustion engine of the invention is a definition given to the foregoing seventh additional feature. That is, when the air-fuel ratio is changed from the lean air-fuel ratio to the stoichiometric air-fuel ratio according to the operating conditions of the internal combustion engine, compulsory change of the air-fuel ratio to the rich air-fuel ratio is inhibited, and operation at the stoichiometric air-fuel ratio is started immediately, and thereafter, the air-fuel ratio of the exhaust gas is gradually changed to the rich air-fuel ratio depending on the temperature rise of the NOx absorber catalyst.

As a result, in the tenth additional feature of the method of purifying exhaust gas of an internal combustion engine of the invention, it is possible to favorably reduce the exhaust gas.

An eleventh additional feature of the method of purifying exhaust gas of an internal combustion engine of the invention is a definition given to claim 1 or claim 8. That is, temperature of the NOx absorber catalyst is estimated on the basis of operating conditions of the internal combustion engine.

As a result, in the eleventh additional feature of the method of purifying exhaust gas of an internal combustion engine of the invention, cost of the system will be saved.

A twelfth additional feature of the method of purifying exhaust gas of an internal combustion engine of the invention is a definition given to claim 1 or claim 8. That is, temperature of the NOx absorber catalyst is estimated on the basis of exhaust gas temperature.

As a result, in the twelfth additional feature of the method of purifying exhaust gas of an internal combustion engine of the invention, it is possible to estimate the temperature of the NOx absorber catalyst more accurately and effectively restrain toxic components of the exhaust gas from increase.

A thirteenth additional feature of the method of purifying exhaust gas of an internal combustion engine of the invention is a definition given to claim 1 or claim 8. That is, a catalyst temperature detection sensor detects a temperature of the NOx absorber catalyst.

As a result, in the thirteenth additional feature of the method of purifying exhaust gas of an internal combustion engine of the invention, it is possible to restrain more effectively toxic components of the exhaust gas from increase.

What is claimed is:

1. A method of purifying exhaust gas of an internal combustion engine comprising a NOx absorber catalyst that absorbs NOx when an oxygen concentration of the exhaust gas is excessively increased and releases the absorbed NOx and reduces the NOx at the same time when the oxygen concentration of the exhaust gas is lowered, wherein an air-fuel ratio of the exhaust gas flowing into the said NOx absorber catalyst is temporarily changed from a lean air-fuel ratio to a rich air-fuel ratio in order to release the NOx absorbed by the NOx absorber catalyst and reduce the NOx;

wherein the NOx absorber catalyst can absorb NOx but does not release the absorbed NOx when a temperature of the NOx absorber catalyst is within a first temperature range from a predetermined temperature T0 to a first predetermined temperature T1, and the NOx absorber catalyst can sufficiently absorb NOx but does not sufficiently release the absorbed NOx when a temperature of the NOx absorber catalyst is within a second temperature range from the first predetermined temperature T1 to a second predetermined temperature T2, the method comprising:
preventing change of air-fuel ratio of the exhaust gas to the rich operation state for the purpose of releasing and reducing NOx, if temperature of said NOx absorber catalyst is lower than the first predetermined temperature T1, and setting the air-fuel ratio to be less rich at first and then grow gradually richer at the time of temporarily changing the air-fuel ratio of the exhaust gas to the rich air-fuel ratio for the purpose of releasing and reducing NOx, if temperature of said NOx absorber catalyst is higher than the first predetermined temperature T1 and lower than the second predetermined temperature T2.

2. The method of purifying exhaust gas of an internal combustion engine according to claim 1, wherein at the time of temporarily changing the air-fuel ratio of the exhaust gas to the rich operation state, the air-fuel ratio is set to gradually grow richer depending on the temperature of said NOx absorber catalyst.

3. The method of purifying exhaust gas of an internal combustion engine according to claim 1, wherein temperature of said NOx absorber catalyst is estimated on the basis of operating conditions of the internal combustion engine.

4. The method of purifying exhaust gas of an internal combustion engine according to claim 1, wherein temperature of said NOx absorber catalyst is estimated on the basis of exhaust gas temperature.

5. The method of purifying exhaust gas of an internal combustion engine according to claim 1, wherein a catalyst temperature detection sensor detects a temperature of said NOx absorber catalyst.

6. The method of purifying exhaust gas of an internal combustion engine comprising a NOx absorber catalyst that absorbs NOx when an oxygen concentration of the exhaust gas is excessively increased and releases the absorbed NOx and reduces the NOx at the same time when the oxygen concentration of the exhaust gas is lowered, wherein an air-fuel ratio of the exhaust gas flowing into the said NOx absorber catalyst is temporarily changed from a lean air-fuel ratio to a rich air-fuel ratio in order to release the NOx absorbed by the NOx absorber catalyst and reduce the NOx;

wherein the NOx absorber catalyst can absorb NOx but does not release the absorbed NOx when a temperature of the NOx absorber catalyst is within a first temperature range from a predetermined temperature T0 to a first predetermined temperature T1, and the NOx absorber catalyst can sufficiently absorb NOx but does not sufficiently release the absorbed NOx when a temperature of the NOx absorber catalyst is within a second temperature range from the first predetermined temperature T1 to a second predetermined temperature T2, the method comprising:

changing temporarily the air-fuel ratio of the exhaust gas to be nearly the stoichiometric air-fuel ratio and raising the temperature of said NOx absorber catalyst at the time of temporarily changing the air-fuel ratio of the exhaust gas to the rich air-fuel ratio for the purpose of releasing and reducing NOx, if temperature of said NOx absorber catalyst is lower than the first predetermined temperature T1, and changing the air-fuel ratio of the exhaust gas to the rich air-fuel ratio, and releasing and reducing NOx from said NOx absorber catalyst at the same time, when the temperature of said NOx absorber catalyst is raised to not lower than the first predetermined temperature T1.

7. The method of purifying exhaust gas of an internal combustion engine according to claim 6, wherein if the temperature of the NOx absorber catalyst is lower than the second predetermined temperature T2, timing of temporarily changing the air-fuel ratio of the exhaust gas to the rich air-fuel ratio for the purpose of releasing and reducing NOx is delayed.

8. The method of purifying exhaust gas of an internal combustion engine according to claim 6, wherein at the time of changing the air-fuel ratio of the exhaust gas to the rich operation state, the air-fuel ratio is set to be less rich at first and then grow gradually richer.

9. The method of purifying exhaust gas of an internal combustion engine according to claim 8, wherein at the time of changing the air-fuel ratio of the exhaust gas to the rich operation state, the air-fuel ratio gradually grows richer depending on the temperature of the NOx absorber catalyst.

10. The method of purifying exhaust gas of an internal combustion engine comprising means for controlling an air-fuel ratio of the internal combustion engine by changing an air-fuel ratio of the exhaust gas to a lean air-fuel ratio, a stoichiometric air-fuel ratio or a rich air-fuel ratio according to operating conditions of the internal combustion engine and a NOx absorber catalyst for absorbing NOx when an oxygen concentration of exhaust gas flowing in is excessively increased and releasing NOx reducing the NOx at the same time when the oxygen concentration of the exhaust gas is lowered, wherein at the time of changing the air-fuel ratio from the lean air-fuel ratio to the stoichiometric air-fuel ratio according to a change of operating conditions of the internal combustion engine, the air-fuel ratio is changed to the stoichiometric air-fuel ratio after the air-fuel ratio has been compulsorily changed to the rich air-fuel ratio, whereby NOx absorbed by said NOx absorber catalyst during the lean operation is released and is reduced at the same time, wherein the NOx absorber catalyst can absorb NOx but does not release the absorbed NOx when a temperature of the NOx absorber catalyst is within a first temperature range from a predetermined temperature T0 to a first predetermined temperature T1, and the NOx absorber catalyst can sufficiently absorb NOx but does not sufficiently release the absorbed NOx when a temperature of the NOx absorber catalyst is within a second temperature range from the first predetermined temperature T1 to a second predetermined temperature T2, the method comprising preventing from compulsory change of the air-fuel ratio of the exhaust gas to the rich air-fuel ratio and starting immediately operation at the stoichiometric air-fuel ratio, when the temperature of said NOx absorber catalyst is lower than the first predetermined temperature T1.

11. The method of purifying exhaust gas of an internal combustion engine according to claim 10, wherein after the air-fuel ratio is changed from the lean air-fuel ratio to the stoichiometric air-fuel ratio the air-fuel ratio of the exhaust gas is gradually changed to the rich air-fuel ratio depending on a temperature rise of said NOx absorber catalyst.

12. The method of purifying exhaust gas of an internal combustion engine according to claim 10, wherein temperature of said NOx absorber catalyst is estimated on the basis of operating conditions of the internal combustion engine.

13. The method of purifying exhaust gas of an internal combustion engine according to claim 10, wherein temperature of said NOx absorber catalyst is estimated on the basis of exhaust gas temperature.

14. The method of purifying exhaust gas of an internal combustion engine according to claim 10, wherein a catalyst temperature detection sensor detects a temperature of said NOx absorber catalyst.

15. The method of purifying exhaust gas of an internal combustion engine according to claim 10, wherein after the air-fuel ratio is changed from the lean air-fuel ratio to the stoichiometric air-fuel ratio the air-fuel ratio of the exhaust gas is variably set to the rich air-fuel ratio when the temperature of said NOx absorber catalyst becomes greater than the first predetermined temperature T1.

16. The method of purifying exhaust gas of an internal combustion engine according to claim 15, wherein when the air-fuel ratio of the exhaust gas is changed to the rich air-fuel ratio, the air-fuel ratio is set to be less rich at first and then grow gradually richer based on the temperature of the NOx absorbing catalyst.

* * * * *